Oct. 14, 1924. 1,511,373

V. J. SHEPARD

RESILIENT CENTER FOR FLEXIBLE GEARS

Filed March 17, 1922

WITNESSES:

INVENTOR
Victor J. Shepard.
BY
ATTORNEY

Patented Oct. 14, 1924.

1,511,373

UNITED STATES PATENT OFFICE.

VICTOR J. SHEPARD, OF PITTSBURGH, PENNSYLVANIA, ASSIGNOR TO WESTING-HOUSE ELECTRIC & MANUFACTURING COMPANY, A CORPORATION OF PENNSYLVANIA.

RESILIENT CENTER FOR FLEXIBLE GEARS.

Application filed March 17, 1922. Serial No. 544,518.

*To all whom it may concern:*

Be it known that I, VICTOR J. SHEPARD, a citizen of the United States, and a resident of Pittsburgh, in the county of Allegheny and State of Pennsylvania, have invented a new and useful Improvement in Resilient Centers for Flexible Gears, of which the following is a specification.

My invention relates to flexible elements for electric locomotive drives, more especially to flexible gears employed in such driving mechanisms to cushion the impact shock transmitted through the jackshaft gear to the driving motors.

It is among the objects of my invention to provide a gear structure which shall have a flexible connection between the motor and the crank-pin support and between the latter and the main drive shaft.

It is a further object of my invention to provide a gear design which shall be of simple, compact structure and which shall be economical to manufacture and applicable to the standard drives of some types of modern locomotives.

It has been common practice to provide flexible elements between the jackshafts and motors of electric locomotive drives which usually consist of flexible spring members disposed between the hub and rim of the jackshaft gears to cushion the impact transmitted to the motor pinions.

In my present invention, I provide a flexible gear which has an intermediate floating center or crank-pin support between the hub and working rim. The intermediate rim is supported by a set of helical springs tangentially disposed in openings provided in the hub, so that the driving torque shall be transmitted through the springs. This construction provides a double flexing structure between the shaft and the gear rim which functions to not only prevent impact on the motor pinions but also to absorb the shock ordinarily transmitted from one side of the jackshaft to the other and it also provides a flexible connection between the connecting rods and the main drive gear which permits varying the distance between the supports.

Figure 1:
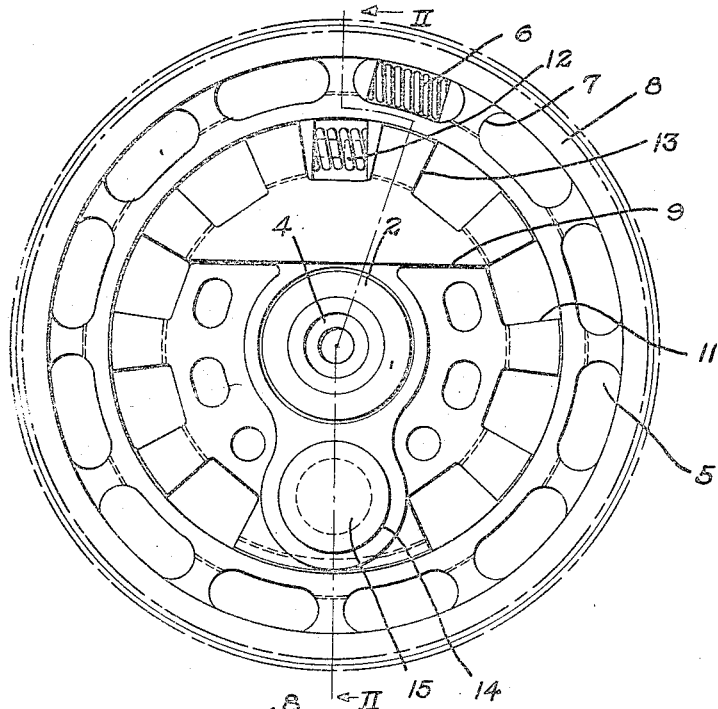
Figure 2:
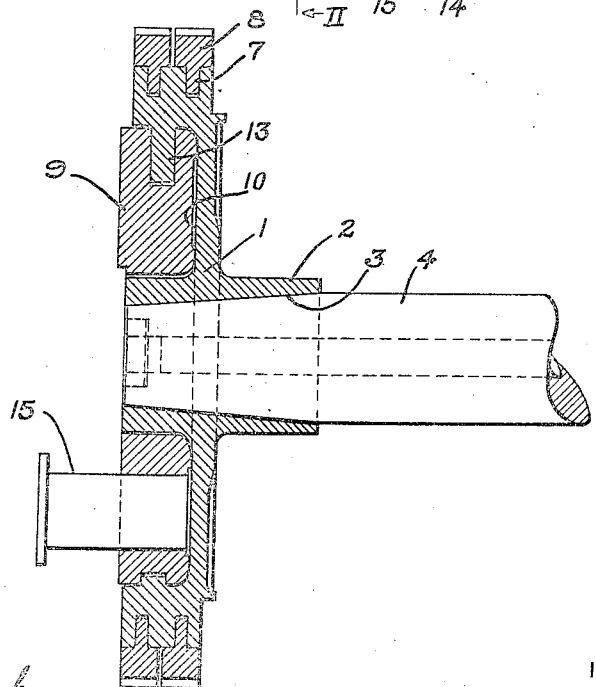

In the accompanying drawing constituting a part hereof and in which like reference characters designate like parts, Figure 1 is a front elevational view of a jackshaft gear formed in accordance with this invention; and Fig. 2 is a cross-sectional view thereof taken along the line II—II of Fig. 1.

The gear structure (Fig. 1) consists of a central supporting member 1 having a projecting hub portion 2 and a tapered opening 3 adapted to seat on a correspondingly shaped portion of a jackshaft 4. The outer periphery of the member 1 is provided with a plurality of openings 5 adapted to receive a plurality of helical coil springs 6 which are tangentially disposed therein and have their ends abutting against a plurality of depending lugs 7 projecting from the gear rim 8.

A concentric floating ring 9 is disposed within an annular recess 10 provided in one side of the member 1. The ring 9 is provided with a plurality of openings 11 that are adapted to receive helical springs 12 which engage the depending lugs 13 projecting from the hub support 1. The ring 9 is also provided with an eccentric boss 14 adapted to receive a crank pin 15 which is connected, by a connecting rod, to the drive wheels (not shown).

Clearance is provided between the ring 9 and the hub 1 to permit loading the springs 6 and 12 through which the driving pin 15 is actuated. The springs 6 and 12, connecting the member 1, the gear rim 8 and floating ring 9, respectively, are designed to remain inactive during the operation of the motors up to a certain predetermined torque, but, in case of the connecting rod support pin (not shown) moving up and down on account of improper alignment, or if the axis of the connecting rod pin moves vertically, the springs will yield to prevent undue stressing.

It will be obvious from the above description of my invention that flexible gears formed in accordance therewith provide an exceptionally resilient connection between the jackshaft and the motor shaft and also between the connecting rods, jackshaft and main drive gears. It is also obvious that this double flexing structure permits balancing the impact or shock transmitted to one side of the jackshaft so that the working parts are uniformly stressed at all times. The double flexing feature also functions to adjust the parts to variations in dimensions caused by wear or severe stressing.

Although I have described a specific embodiment of my invention, it will be obvious to those skilled in the art that various modifications may be made in the details of construction thereof without departing from the principles herein set forth.

I claim as my invention:

1. A flexible gear wheel comprising a central hub support, a gear rim, and a floating intermediate support, said hub, rim and intermediate support being yieldingly connected.

2. A flexible gear wheel comprising a central hub support, a gear rim, and a floating intermediate support, said hub, rim and intermediate support being yieldingly connected by a plurality of resilient members.

3. A flexible gear wheel comprising a central hub support, a gear rim disposed without the periphery of said hub, said hub having an annular recess in one side thereof, a correspondingly shaped ring for securing a crank pin in said recess and means for providing resilient connections between said hub, ring and gear rim, respectively.

4. A flexible gear wheel comprising a central hub support, a concentric gear rim disposed without the periphery of said hub, said hub having a concentric annular recess in one side thereof, a correspondingly shaped ring for securing a crank pin in said recess and means for providing resilient connections between said hub, ring and gear rim, respectively, said means comprising a plurality of helical coil springs disposed tangentially around the outer peripheries of said hub and ring.

5. A flexible gear wheel comprising a central hub support, a concentric gear rim disposed without the periphery of said hub, said hub having an annular concentric recess in one side thereof, a correspondingly shaped ring for securing a crank pin in said recess and means for providing resilient connections between said hub, ring and gear rim, said means comprising a plurality of radial notches in the hub and rim in working alignment, a plurality of lugs extending into said notches, and a plurality of coil springs disposed in said notches in engagement with said lugs.

6. A flexible gear wheel comprising a central hub, a concentric gear rim disposed without the periphery of said hub and a resilient crank-pin support mounted in said hub.

7. A flexible gear wheel comprising a central hub, a concentric gear rim disposed without the periphery of said hub and a resilient crank-pin support, said crank-pin support being yieldingly connected between said hub and said rim.

8. A flexible gear wheel comprising a central hub, a concentric gear rim disposed without the periphery of said hub and a resilient crank-pin support, said crank-pin support being yieldingly connected between said hub and said rim by a plurality of tangentially disposed coil springs.

In testimony whereof, I have hereunto subscribed my name this 10th day of March, 1922.

VICTOR J. SHEPARD.